No. 686,771. Patented Nov. 19, 1901.
G. M. SEARLE & G. N. SAEGMULLER.
MEASURING DEVICE FOR DISTANCE INSTRUMENTS.
(Application filed June 18, 1901.)
(No Model.)
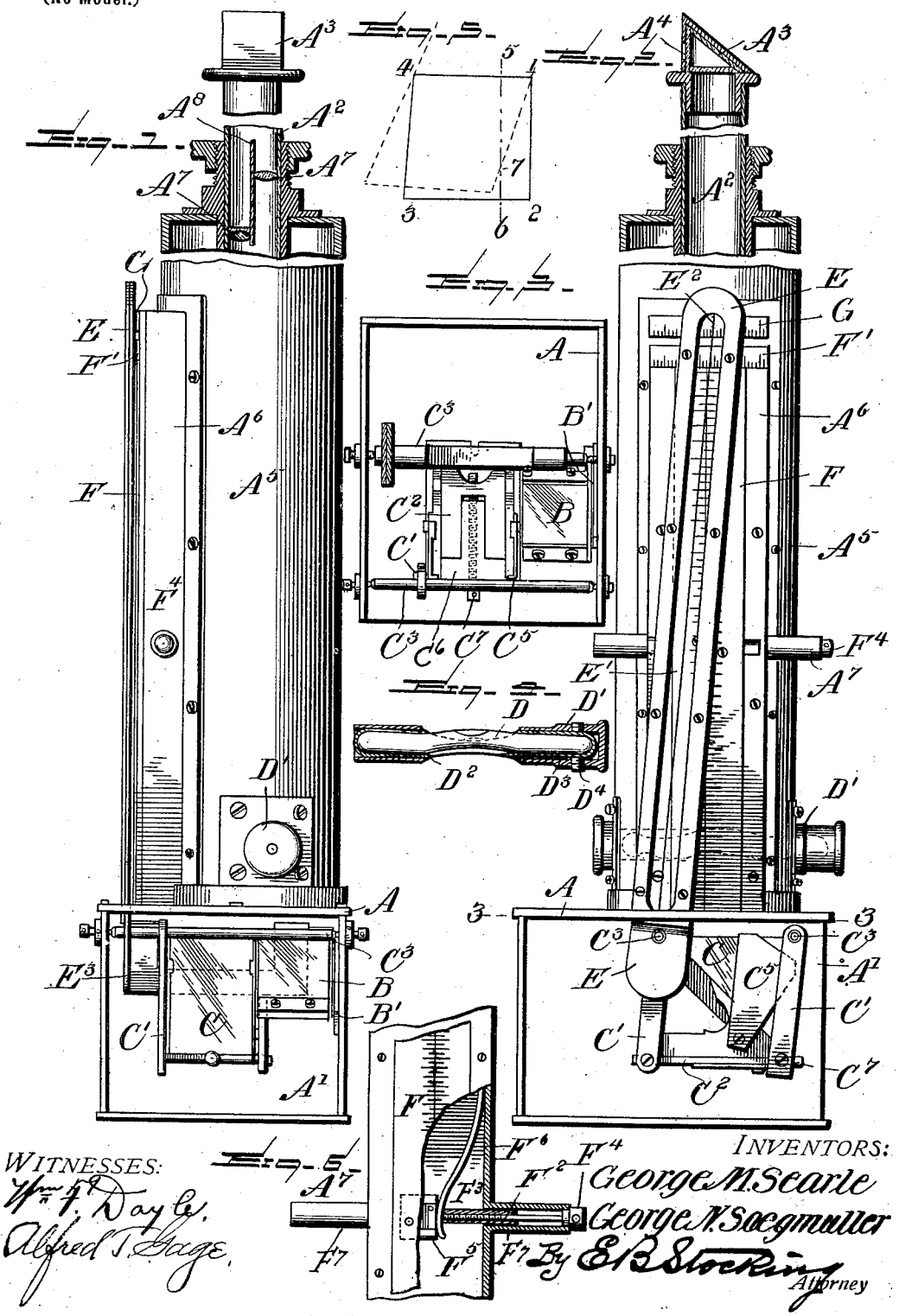
WITNESSES:
INVENTORS:
George M. Searle
George N. Saegmuller
By E. B. Stocking
Attorney

UNITED STATES PATENT OFFICE.

GEORGE M. SEARLE AND GEORGE N. SAEGMULLER, OF WASHINGTON, DISTRICT OF COLUMBIA.

MEASURING DEVICE FOR DISTANCE INSTRUMENTS.

SPECIFICATION forming part of Letters Patent No. 686,771, dated November 19, 1901.

Application filed June 18, 1901. Serial No. 65,058. (No model.)

*To all whom it may concern:*

Be it known that we, GEORGE M. SEARLE and GEORGE N. SAEGMULLER, citizens of the United States, residing at Washington, in the District of Columbia, have invented certain new and useful Improvements in Measuring Devices for Distance Instruments, of which the following is a specification, reference being had therein to the accompanying drawings.

This invention relates to a measuring device for distance instruments, and particularly to a structure in which the relative movement of a movable member may be indicated.

The invention has for an object to provide a construction for supporting a mirror or prism in such manner that the movement thereof may be indicated by an arm adapted to move laterally over a scale or indicating device located relative thereto.

A further object of the invention is to arrange this scale so that the same may be adjusted to adapt the invention for use at different heights above the water-level of a vessel upon which it may be used.

Other objects and advantages of the invention will hereinafter appear in the following description thereof, and the novel features thereof will be particularly pointed out in the appended claims.

In the drawings, Figure 1 is a front elevation of a distance instrument having the invention applied thereto. Fig. 2 is a similar side view with parts in section and a wall of the base removed. Fig. 3 is a cross-section on the line 3 3 through the lower portion of Fig. 2. Fig. 4 is a vertical section through the level and its case. Fig. 5 is a diagrammatic illustration of the mathematical relation of the support for the mirror or prism, and Fig. 6 is a detail elevation with parts in section of the adjusting means for the distance-scale.

Like characters of reference indicate like parts throughout the several figures of the drawings.

While this invention is adapted for application to any suitable character of distance or measuring instruments, it is particularly intended for use with a range-finder such as is disclosed by our application filed February 26, 1901, Serial No. 46,229, wherein the general form of instrument illustrated in the present application is disclosed.

The letter A indicates the base or foundation of a casing, which may be of any desired shape and provided with an open front A' and cylindrical body $A^5$, extending upward therefrom and provided with a straight or flat face $A^6$, adapted to receive certain scales, to be hereinafter described. The upper end of this cylindrical body is provided with a telescopic connecting-tube $A^2$, having at its upper end a reflecting mirror or prism $A^3$ and a sight-opening $A^4$ opposite the same. When the instrument is used for distances greater than can be detected by the eye alone, this tube may be provided with telescopic lenses $A^7$, located upon opposite sides of the partition $A^8$, said lenses being of different power relative to the fixed and movable prisms beneath the same.

Within the base or casing A and beneath the telescopic section $A^2$ a fixed prism or mirror B is disposed at one side of the casing and a movable prism or mirror C located adjacent thereto, so that the objects reflected from the two prisms will appear in parallelism upon the reflecting-surface $A^3$ or, if this surface be omitted, may be viewed by the operator by looking downward through the upper open portion of the casing. It will be understood that in the present invention either a prism or a mirror may be used as a reflecting means, these devices being considered the equivalent of each other. Above the fixed mirror B a spirit-level D is located and removably held in position by means of a casing D' inserted in the tubular portion $A^5$ of the instrument, so that it may be withdrawn therefrom. This level D may be surrounded by a protecting-shell $D^2$, adapted to snugly fit the casing at one end and loosely at its opposite end $D^3$, where it may be adjusted relatively to the casing D' by means of the oppositely-disposed screws $D^4$ and the bubble of the level thus adjusted to a proper relative central position in its relation to the instrument. This level is slightly curved, as shown, and located at a distance from the sight-opening $A^4$ equal to the radius of the curvature of the level measured from the sight-opening $A^4$ to the reflecting-surface $A^3$, and thence downward to the level D, thus keeping the apparent position of the bubble in the level always upon a horizontal plane.

The fixed prism B may be held in position by any desired means—for instance, a bracket $B'$, extending from one wall of the casing A, while the movable prism C is supported by hangers $C'$, supported from pivots or bearings $C^3$, journaled in the opposite sides of the casing, and said hangers are connected at their lower ends by a separated or two-part plate $C^2$, upon which the prism is adapted to rest and be held by any suitable means—for instance, a spring-clip $C^5$, mounted upon a portion of the plate $C^2$ and adapted to engage an edge of the prism to hold the same in proper position. It will be seen from Fig. 2 and from the diagram in Fig. 5 that the upper ends of the supporting-hangers $C'$ are located at a less distance apart than the lower ends, so that when the parts are swung, as indicated by dotted lines in Fig. 5, one end of the connecting-plate is elevated and the other correspondingly depressed. For the purpose of thus swinging these hangers the rear pivoting-yoke $E^3$ has secured thereto the lower end of an indicating-arm E, the movement of which rotates this pivot and the hanger carried thereby to properly adjust the mirror for the purposes described.

Under many conditions it is desirable to adjust the extent of movement imparted to the prism C, and this is effected by means of an adjustment of the separated or two-part plate $C^2$, one part $C^6$ of which is provided with an adjusting-screw $C^7$ entering the corresponding part, whereby an adjustment of said screw separates the parts and lengthens or shortens the length of the plate and the consequent distance between the lower ends of the hangers $C'$, which determines the extent of movement given the prism C in the operation of the indicating-arm. This indicating-arm E is disposed at one side of a central vertical line of the casing on the face $A^6$, and upon such a line a distance scale or measure F is provided, so that the angle formed by the intersection between the arm E and the distance-scale F will indicate directly to the observer the distance from the instrument to the object reflected by the mirror C when such object is in parallelism with the reflected bubble from the level D, when such level is used, or with the offing when the level is omitted. This arm E may be of any construction or transparent material; but we have shown the same as provided with a transparent plate $E'$, secured therein and having traced thereon a single central line $E^2$, so that in the movement of this arm over the scale F the indications of the scale may be clearly observed through the transparent material and the exact point of intersection with the line $E^2$ determined. It will be understood that the scale F is suitably graduated to indicate various distances, the said graduations being based upon the necessary computation for the instrument under certain fixed conditions. It will be obvious, however, that if the instrument be used at different heights above the water-level upon a vessel it would be necessary to change or rearrange these distance-indications, as the field of view is greater the higher the instrument is placed above the water-level. When used as a range-finder upon a steam-propelled vessel, it will be readily understood that the coal consumption of the vessel constantly changes the depth to which the same is submerged into the water, and consequently when the instrument is in a fixed position the distance between the water-level and the mirror C will vary or increase, depending upon the depth of immersion of the vessel at the particular time. This distance above the water-level can be readily ascertained by the usual means present upon the vessels, and for the purpose of adjusting the distance-scale F to compensate for this distance the same is mounted to move laterally with one of its ends in relation to a fixed height-scale $F'$, which is graduated for different heights above a water-level usually found in the character of vessels upon which this instrument is used. This adjustment of the distance-scale F may be effected by any desired means—for instance, a micrometer-screw $F^2$, mounted upon the casing, as shown in Fig. 6, and connected to a sleeve $F^3$, carried by a lug $F^5$ on the scale F, extended through a slot in the casing, so as to shift the scale under tension of the spring $F^6$ transversely of the casing in relation to the scale $F'$ to compensate for different distances above the water-level. It will be observed that the shifting of this scale F affects the point of intersection between the center line $E^2$ of the indicating-arm E and the center line upon the scale. The screw $F^2$ is provided with an operating-head $F^4$, and the casing has opposite extensions $A^7$, within which the sleeves $F^3$ are adapted to travel.

At the upper end of the indicating-arm and above the height-scale $F'$ an offing-scale G is affixed to the face $A^6$ of the casing and the indications thereon adapted to coincide with the central line $E^2$ upon the indicating-arm E, so as to properly adjust the instrument to the offing as a basis for calculation with the other members thereof. The lower end of the arm E is provided with any suitable character of counterbalancing device. For instance, the yoke $E^3$, carrying the rear hangers $C'$, is weighted, by which the arm E, carried by the yoke, may be rendered constant and steady in its movements, so that it can be adjusted by the operator moving the upper end thereof. This arm extends upward from the base A through a slot, so as to bring the arm directly adjacent to the distance-scale F.

The principle upon which this measuring device for small angles rests is the general mathematical principle of the quadrilateral, which is best illustrated by means of the diagram shown in Fig. 5. In this diagram the sides 1 2 and 1 4 are of equal length, while the connecting sides 2 3 and 3 4 are longer than the corresponding sides 1 2 and 1 4 by a small fraction of the latter, and the angle formed between the points 1, 2, and 4 is a right angle. It will be seen that by moving the sides 1 2 and 3 4 laterally, as indicated by dotted lines in Fig. 5, and keeping their lengths unchanged the change in horizontal direction of the line 2 3 or the angle between points 1, 2, and 3 is inversely proportional to the vertical line 5 6, which is intersected at the point 7 by the line 1 2, thus throwing the line 2 3 into a position with one end thereof elevated. A mirror or prism is supported upon the line 2 3, and placing the line 5 and 6 at a distance from the line 1 2 representing or proportionally to the height above the water at which the instrument is used the distance of the object will be in a convenient proportion to the point of intersection at 7 and may be read off a suitable scale placed upon the line 5 6. From the foregoing explanation of the principle involved in this invention the proper proportional relation between the hangers for the movable mirror or prism, the indicating-arm E, and the scale F will be readily understood.

In the operation of this invention the fixed and movable mirrors opposite the opening A' in the casing A reflect an image upward to the mirror or prism $A^3$ opposite the sight-opening $A^4$. If the instrument is used with the level, the image of the bubble therein is reflected in the mirror $A^3$ by prism B, while the movable mirror C is adjusted until the image of the object is brought into parallelism with the reflected bubble, and the result of this movement, as determined by the indicating-arm E in relation to the distance-scale F, indicates the exact distance from the object to the instrument. The scale F is graduated to any desired degree of fineness suitable to the character of work for which the instrument is used and the dimension of the angle employed. If the level is omitted from above the fixed object mirror, the reflected line of the offing or horizon from prism B is used in the same manner as the reflected bubble and brought into parallelism with the object, while the result of the movement or the distance is shown at the point of intersection between the line $E^2$ upon the arm E and the center line upon the scale F. As before described, it is necessary that the scale F be adjusted for different heights above the water-level which it may occupy at different times, and it is therefore moved laterally over the offing-scale F' in order to secure this adjustment and to combine in a single simple instrument an accurate means of determining measurement and adjusting for different heights above the sea-level which do not require any calculation on the part of the operator, and consequently can be efficiently used by seamen and other persons who are not familiar with the necessary mathematical calculations required to determine the range or distance between an object and the instrument or other necessary data if the instrument be used in surveying or other purposes for measuring elevations.

Having described our invention, what we claim is—

1. In a distance instrument, a movable reflector supported by hangers, the opposite ends of which are at different distances apart; substantially as specified.

2. In a distance instrument, a movable reflector supported by hangers, the opposite ends of which are at different distances apart, and an indicating-arm carried by the axis of one of said hangers and adapted to coöperate with a distance-scale; substantially as specified.

3. In a distance instrument, the combination with parallel fixed and movable reflectors, of hangers adapted to support said movable reflector and having their opposite ends at different distances from each other; substantially as specified.

4. In a distance instrument, the combination with parallel fixed and movable reflectors, of hangers adapted to support said movable reflector and having their opposite ends at different distances from each other, a distance-scale, and an indicating-arm carried by the axis of one of said hangers and adapted to move over said scale; substantially as specified.

5. In a distance instrument, the combination with parallel fixed and movable reflectors, of hangers adapted to support said movable reflector and having their opposite ends at different distances from each other, a distance-scale, an indicating-arm carried by the axis of one of said hangers and adapted to move over said scale, a separated plate connecting said hangers together at one end, and means for adjusting the length of said plate and the distance between the ends of said hangers; substantially as specified.

6. In a distance instrument, the combination with parallel fixed and movable reflectors, of hangers adapted to support said movable reflector and having their opposite ends at different distances from each other, a distance-scale, an indicating-arm carried by one of said hangers and adapted to move over said scale, a separated plate connecting said hangers together at one end, means for adjusting the length of said plate and the distance between the ends of said hangers, and means for adjusting said distance-scale laterally in relation to a height-scale; substantially as specified.

7. A distance instrument comprising the pivotally-mounted reflecting device, an arm carried by a pivot of said device and provided with a longitudinal indicating-line thereon and movable in the adjustment of said device, and a distance-scale extending longitudinally of the indicating-arm at one side of the pivot of said arm, whereby the indicating-line upon the arm is adapted to intersect the scale-line in the pivotal movement of the reflecting device to indicate the distance; substantially as specified.

8. In a distance instrument comprising a movable reflecting device, a pivotally-mounted indicating-arm movable in the adjustment of said device, a vertically-disposed distance-scale beneath said arm, and means for adjusting said scale in a horizontal line beneath said arm; substantially as specified.

9. In a distance instrument comprising a movable reflecting device, an indicating-arm movable in the adjustment of said device, a vertically-disposed distance-scale beneath said arm, means for adjusting said scale in a horizontal line beneath said arm, a height-scale adapted to coöperate with said horizontally-adjustable scale, and a transparent panel carried by said arm; substantially as specified.

10. In a distance instrument comprising a movable reflecting device, a pivoted indicating-arm movable in the adjustment of said device, a vertically-disposed distance-scale beneath said arm, means for adjusting said scale in a horizontal line beneath said arm, a height-scale adapted to coöperate with said horizontally-adjustable scale, and a transparent panel carried by said arm and having a central line thereof passing through the pivot of the arm and adapted to intersect a vertical line upon the distance-scale beneath the same; substantially as specified.

11. In a distance instrument, the combination with a casing, of fixed and movable reflectors disposed opposite an opening in the lower portion thereof, means for viewing said reflectors at the upper portion of said casing, depending hangers for said movable reflector connected at their lower ends by a plate of adjustable length, an indicating-arm carried by the pivot for one of said hangers, and a distance-scale coöperating with said arm; substantially as specified.

12. In a distance instrument, the combination with a casing, of fixed and movable reflectors disposed opposite an opening in the lower portion thereof, means for viewing said reflectors at the upper portion of said casing, depending hangers for said movable reflector connected at their lower ends by a plate of adjustable length, an indicating-arm carried by the pivot for one of said hangers, a distance-scale coöperating with said arm, a transparent panel in said arm, means for horizontally adjusting said distance-scale, and a height-scale to indicate the degree of adjustment of said distance-scale; substantially as specified.

13. In a distance instrument comprising a movable reflecting device, a pivotally-mounted indicating-arm movable in the adjustment of said device, a vertically-disposed distance-scale beneath said arm, a height-scale extending laterally of said distance-scale, and an offing-scale adapted to register with the upper portion of said indicating-arm; substantially as specified.

14. In a distance instrument, a movable reflector, pivoted hangers for the same, a two-part plate connecting the lower ends of said hangers, and means for adjusting the members of said plate to vary the distance between the lower ends of said hangers; substantially as specified.

15. In a distance instrument, a movable reflecting device, a pivoted indicating-arm movable in the adjustment of said device, a distance-scale beneath said arm and provided with a threaded sleeve upon one face thereof, and an adjusting-screw supported by the casing for effecting a horizontal movement of said scale; substantially as specified.

16. In a distance instrument, a movable reflecting device, a pivoted indicating-arm movable in the adjustment of said device, a distance-scale beneath said arm and provided with a threaded sleeve upon one face thereof, an adjusting-screw supported by the casing for effecting a horizontal movement of said scale, a lateral extension from said casing in which said sleeve is adapted to travel, and a spring adapted to bear upon said sleeve; substantially as specified.

In testimony whereof we affix our signatures in presence of two witnesses.

GEO. M. SEARLE.
GEO. N. SAEGMULLER.

Witnesses:
ALFRED T. GAGE,
GEORGE M. BOND.